US010748110B2

(12) United States Patent
Burnett et al.

(10) Patent No.: US 10,748,110 B2
(45) Date of Patent: Aug. 18, 2020

(54) RFID PART TRACKING AND INFORMATION STORING SYSTEM AND METHOD OF USE

(71) Applicant: DIFR-Tek LLC, Birmingham, MI (US)

(72) Inventors: David R. Burnett, Birmingham, MI (US); Jeffrey R. Kosko, Northville, MI (US); Christopher M. Arizo, West Bloomfield, MI (US)

(73) Assignee: DIFR-TEK LLC, Birmingham, MI (US)

( * ) Notice: Subject to any disclaimer, the term of this patent is extended or adjusted under 35 U.S.C. 154(b) by 0 days.

(21) Appl. No.: 16/269,189

(22) Filed: Feb. 6, 2019

(65) Prior Publication Data

US 2019/0244169 A1    Aug. 8, 2019

Related U.S. Application Data

(60) Provisional application No. 62/626,945, filed on Feb. 6, 2018.

(51) Int. Cl.
    *G06Q 10/08*      (2012.01)
    *G06K 19/077*    (2006.01)
    *G06K 19/07*     (2006.01)
    *G03G 21/16*     (2006.01)

(52) U.S. Cl.
    CPC ..... *G06Q 10/0833* (2013.01); *G06K 19/0725* (2013.01); *G06K 19/07718* (2013.01); *G06K 19/07786* (2013.01)

(58) Field of Classification Search
    CPC ................................................. G06Q 10/0833
    USPC .................................................... 705/22, 28
    See application file for complete search history.

(56) References Cited

U.S. PATENT DOCUMENTS

| | | | |
|---|---|---|---|
| 7,219,834 B2 | 5/2007 | Chang | |
| 7,324,923 B2 | 1/2008 | Dellavilla, Jr. et al. | |
| 7,400,268 B2 | 7/2008 | Wilbrink et al. | |
| 7,551,086 B2 | 6/2009 | Coop et al. | |
| (Continued) | | | |

FOREIGN PATENT DOCUMENTS

| | | |
|---|---|---|
| CN | 201134030 Y | 10/2008 |
| CN | 104574096 A | 4/2015 |
| CN | 104834959 A | 8/2015 |

*Primary Examiner* — Fahd A Obeid
*Assistant Examiner* — Avia Salman
(74) *Attorney, Agent, or Firm* — Dickinson Wright PLLC; Steven Hurles

(57) ABSTRACT

A cloud-based radio frequency identification system and method for maintaining and providing users with part information for a plurality of parts are provided. The system includes a cloud platform server including a part database storing the part information. The cloud platform server communicates with at least one mobile device and send e-mail and text alerts associated with the part information and also provides the part information through an online website. The system includes a manufacturing network coupled to the cloud platform server. A plurality of manufacturing workstations are disposed at locations at which a plurality of operation steps are carried out and allow for at least one of automatic entry and manual entry of the part information. At least one radio frequency handheld scanner communicates with the cloud platform server through the manufacturing network and scans a radio frequency identification tag of each of the parts.

18 Claims, 4 Drawing Sheets

(56) References Cited

U.S. PATENT DOCUMENTS

Figure 1:
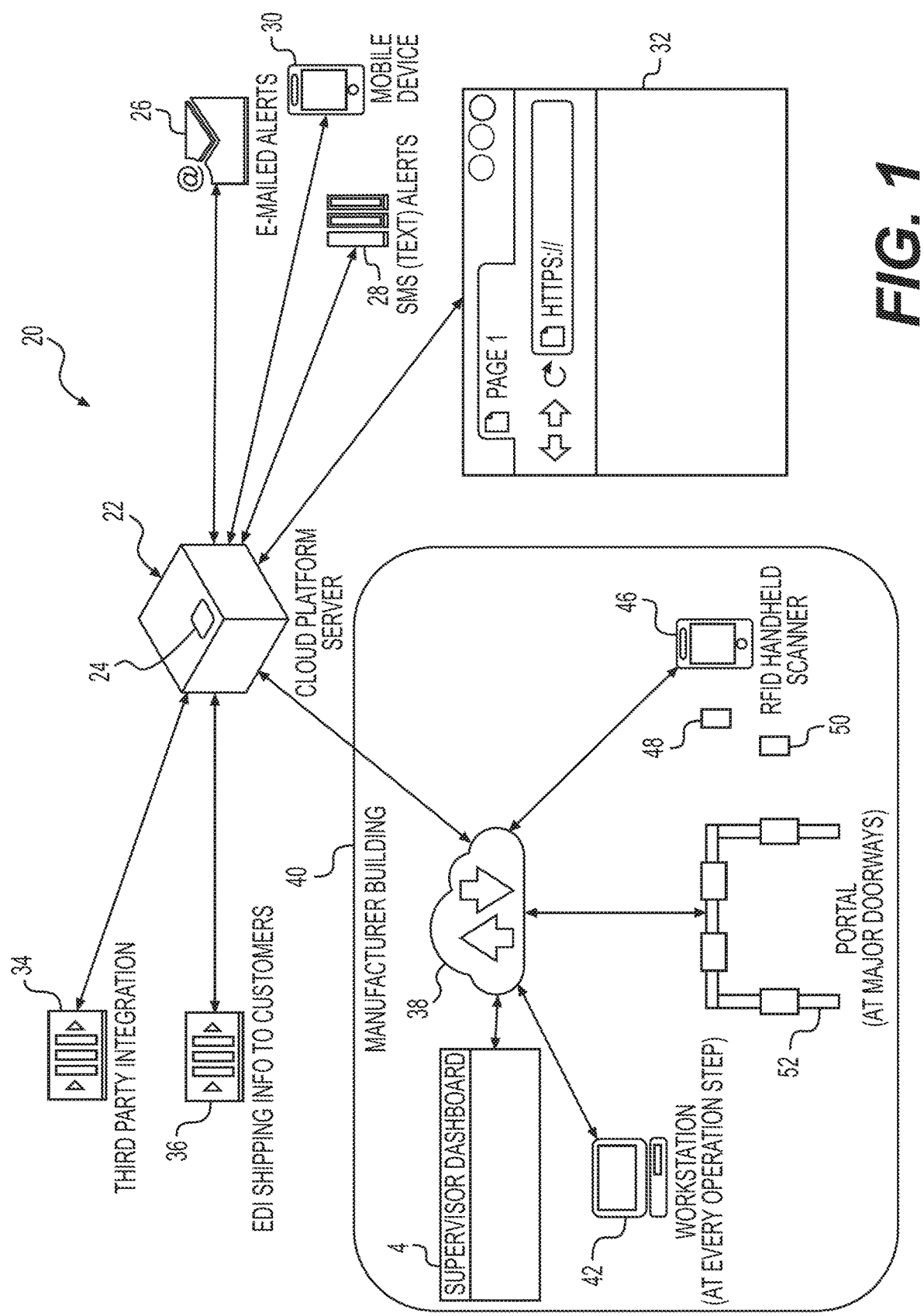

| | | | |
|---|---|---|---|
| 7,602,288 B2* | 10/2009 | Broussard | G06Q 10/087 340/572.1 |
| 7,931,197 B2 | 4/2011 | Brandt et al. | |
| 8,209,076 B2 | 6/2012 | Boss et al. | |
| 8,311,698 B2 | 11/2012 | Boss et al. | |
| 8,543,283 B2 | 9/2013 | Boss et al. | |
| 8,990,099 B2* | 3/2015 | MacDonald | G06Q 50/22 705/2 |
| 8,991,692 B2 | 3/2015 | Kumar et al. | |
| 9,098,593 B2 | 8/2015 | Floyd et al. | |
| 9,262,643 B2* | 2/2016 | Cidon | G06F 21/6218 |
| 2006/0290500 A1* | 12/2006 | Sagawa | G06Q 10/06 340/572.1 |
| 2007/0040682 A1* | 2/2007 | Zhu | G06Q 10/087 340/572.1 |
| 2008/0094178 A1* | 4/2008 | Angerer | G06K 7/0008 340/10.1 |
| 2011/0196760 A1 | 8/2011 | Howard et al. | |
| 2011/0282476 A1* | 11/2011 | Hegemier | G06Q 10/087 700/100 |
| 2014/0291397 A1* | 10/2014 | Caputo | G06Q 10/087 235/385 |
| 2016/0300195 A1 | 10/2016 | Harvey et al. | |

* cited by examiner

RFID PART TRACKING AND INFORMATION STORING SYSTEM AND METHOD OF USE

CROSS-REFERENCE TO RELATED APPLICATIONS

This utility application claims the benefit of U.S. Provisional Application No. 62/626,945 filed Feb. 6, 2018. The entire disclosure of the above application is incorporated herein by reference.

FIELD

The present invention is related, generally, to a cloud-based radio frequency identification (RFID) system for maintaining and providing users with relevant part information from manufacture to disposal (i.e., cradle to grave).

BACKGROUND

This section provides background information related to the present disclosure which is not necessarily prior art.

Radio frequency identification (RFID) tags can be used to uniquely identify a single part or group of similar parts/assemblies. Such RFID tags are typically used at a manufacturer or retailer to track various parts for inventory purposes. However, once the part is sold to another manufacturer or becomes part of another assembly, the RFID tag may no longer be utilized to identify the part. Additionally, information related to these RFID tags or the parts to which they are integrated or affixed typically is not utilized by parts other than the manufacturer or retailer. Thus, the radio frequency identification systems and methods which are currently available could be improved.

SUMMARY

This section provides a general summary of the present disclosure and is not a comprehensive disclosure of its full scope or all of its features, aspects and objectives.

Accordingly, it is an aspect of the present disclosure to provide a cloud-based radio frequency identification system for maintaining and providing users with relevant part information for a plurality of parts from manufacture to disposal. The system includes a cloud platform server including a part database having the relevant part information corresponding to each of the plurality of parts. The cloud platform server is configured to communicate with at least one mobile device regarding the relevant part information. The cloud platform server is also configured to send e-mail alerts associated with the relevant part information and to send text alerts associated with the relevant part information. In addition, the cloud platform server provides the relevant part information through an online website. The system also includes a manufacturing network disposed remotely from and coupled to the cloud platform server and a plurality of manufacturing workstations disposed at locations at which a plurality of operation steps are carried out and in communication with the cloud platform server through the manufacturing network. The plurality of manufacturing workstations are configured to allow for at least one of automatic entry and manual entry of the relevant part information. The system also includes at least one radio frequency handheld scanner in communication with the cloud platform server through the manufacturing network and configured to scan a radio frequency identification tag of each of the plurality of parts.

It is another aspect of the present disclosure to provide a method of maintaining and updating relevant part information for a plurality of parts using a cloud-based radio frequency identification system. The method includes the steps of manufacturing one of the plurality of parts and determining whether the one of the plurality of parts is good. Next, applying a radio frequency identification tag to the one of the plurality of parts in response to determining that the one of the plurality of parts is good. The method continues by associating the one of the plurality of parts with the radio frequency identification tag in a part database of a cloud platform server. The method continues by associating the one of the plurality of parts with dunnage in the part database of the cloud-based platform server. The next step of the method is applying a dunnage radio frequency identification tag to the dunnage and updating the part database of the cloud platform server accordingly. The method also includes the step of scanning the dunnage and the plurality of parts using another of the at least one radio frequency handheld scanner in communication with the cloud platform server and updating the part database of the cloud platform server. The method proceeds with the step of determining whether all of the plurality of parts and only the plurality of parts expected for the dunnage are found during the scan of the dunnage and the plurality of parts. The next step of the method is placing the dunnage on hold in response to determining that at least one of not all of the plurality of parts and only the plurality of parts expected for the dunnage are not found during the scan of the dunnage and the plurality of parts. The method proceeds by sending the dunnage to a quality control part review and initiating shipment of dunnage to at least one of a plurality of customers and passing the dunnage through a shipment portal to verify the plurality of parts to the dunnage and updating the part database of the cloud platform server. The method additionally includes the steps of determining whether the plurality of parts are verified to the dunnage and setting the dunnage as sent to customer review in the part database of the cloud platform server in response to determining that the plurality of parts are verified to the dunnage.

The radio frequency identification system and method according to the present disclosure provides numerous benefits, which are especially attractive to both component part manufacturers and users of parts.

These and other aspects and areas of applicability will become apparent from the description provided herein. The description and specific examples in this summary are intended for purpose of illustration only and are not intended to limit the scope of the present disclosure.

DRAWINGS

Figure 2A:
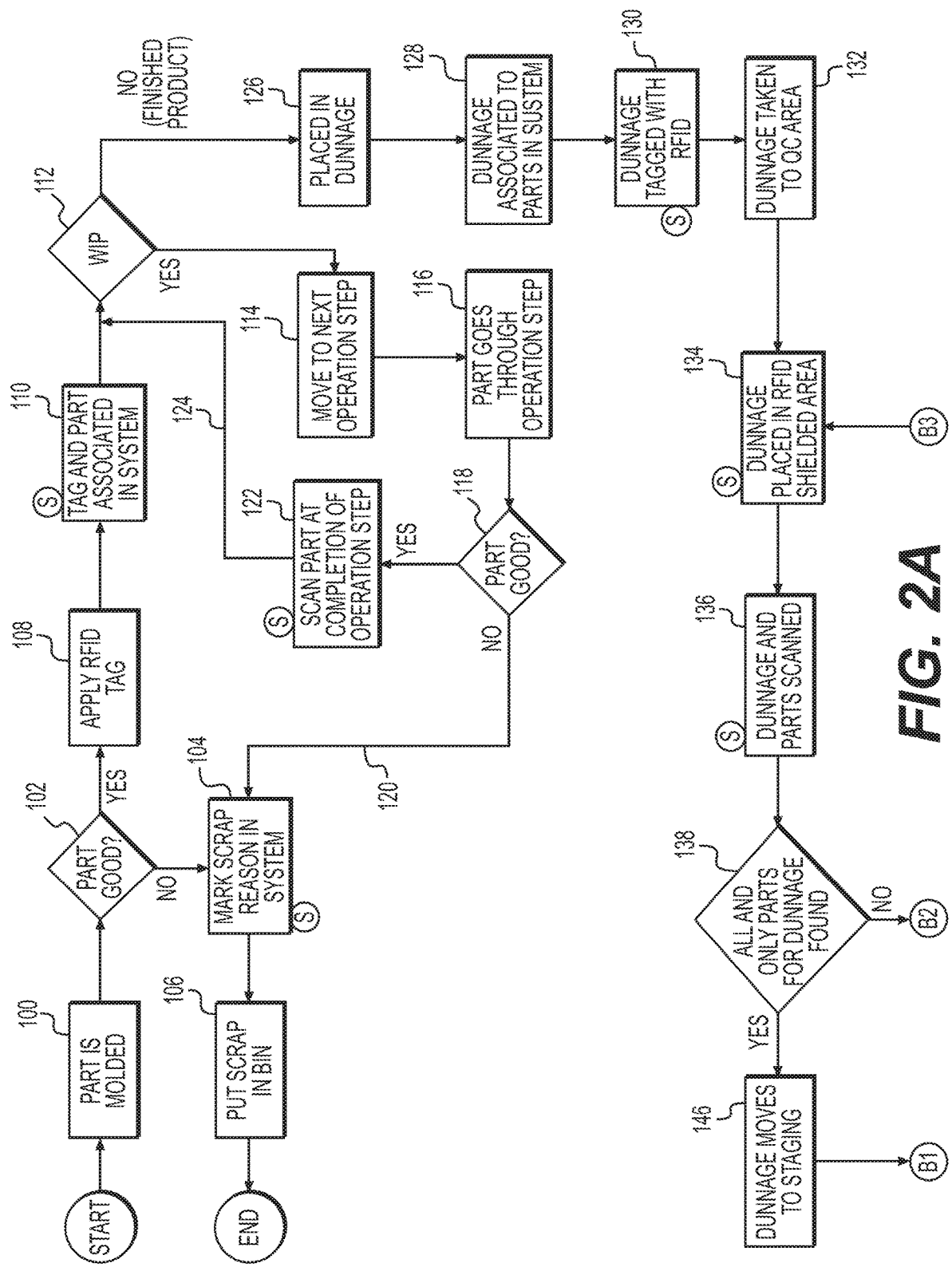
Figure 2B:
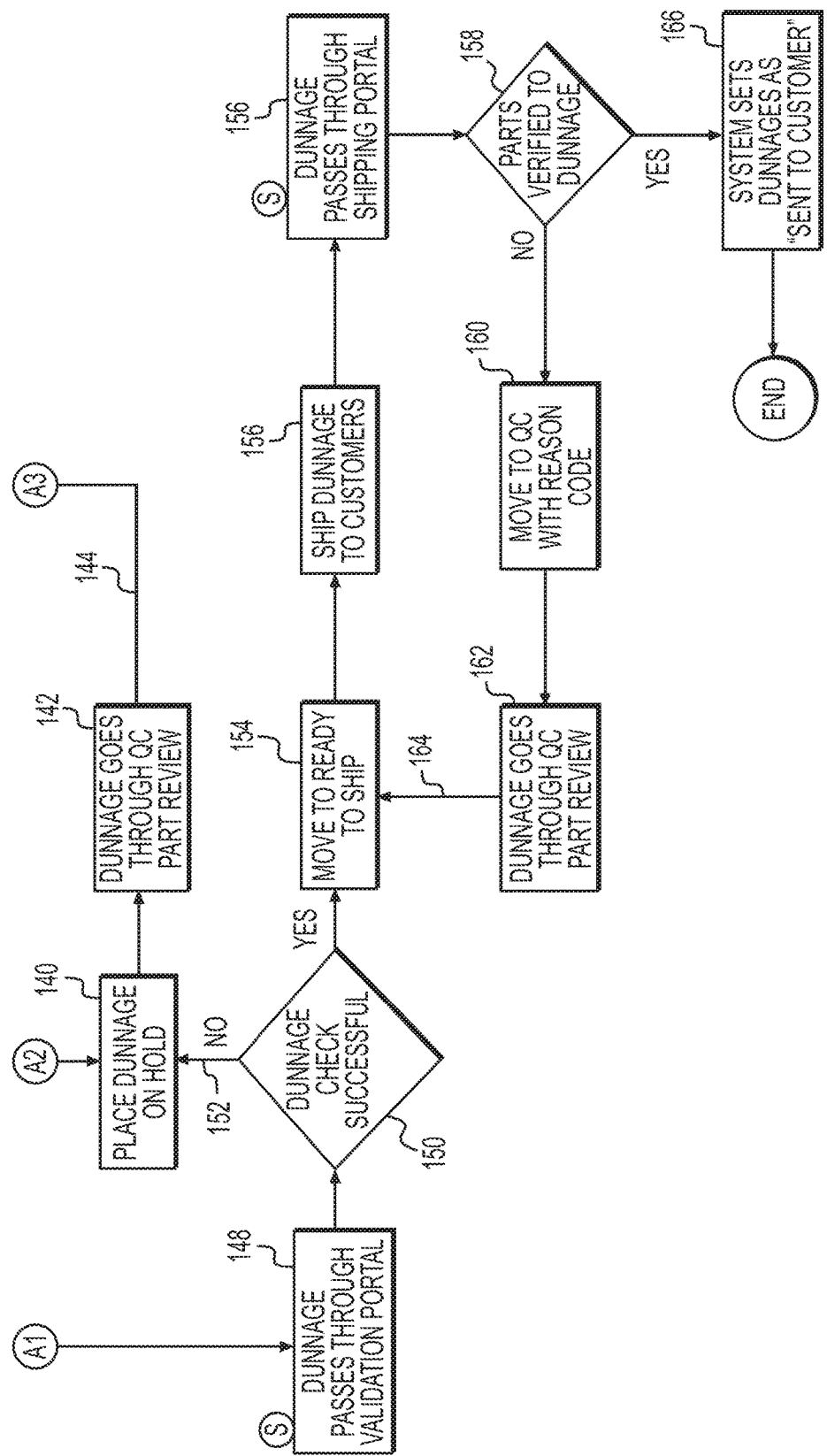
Figure 3:
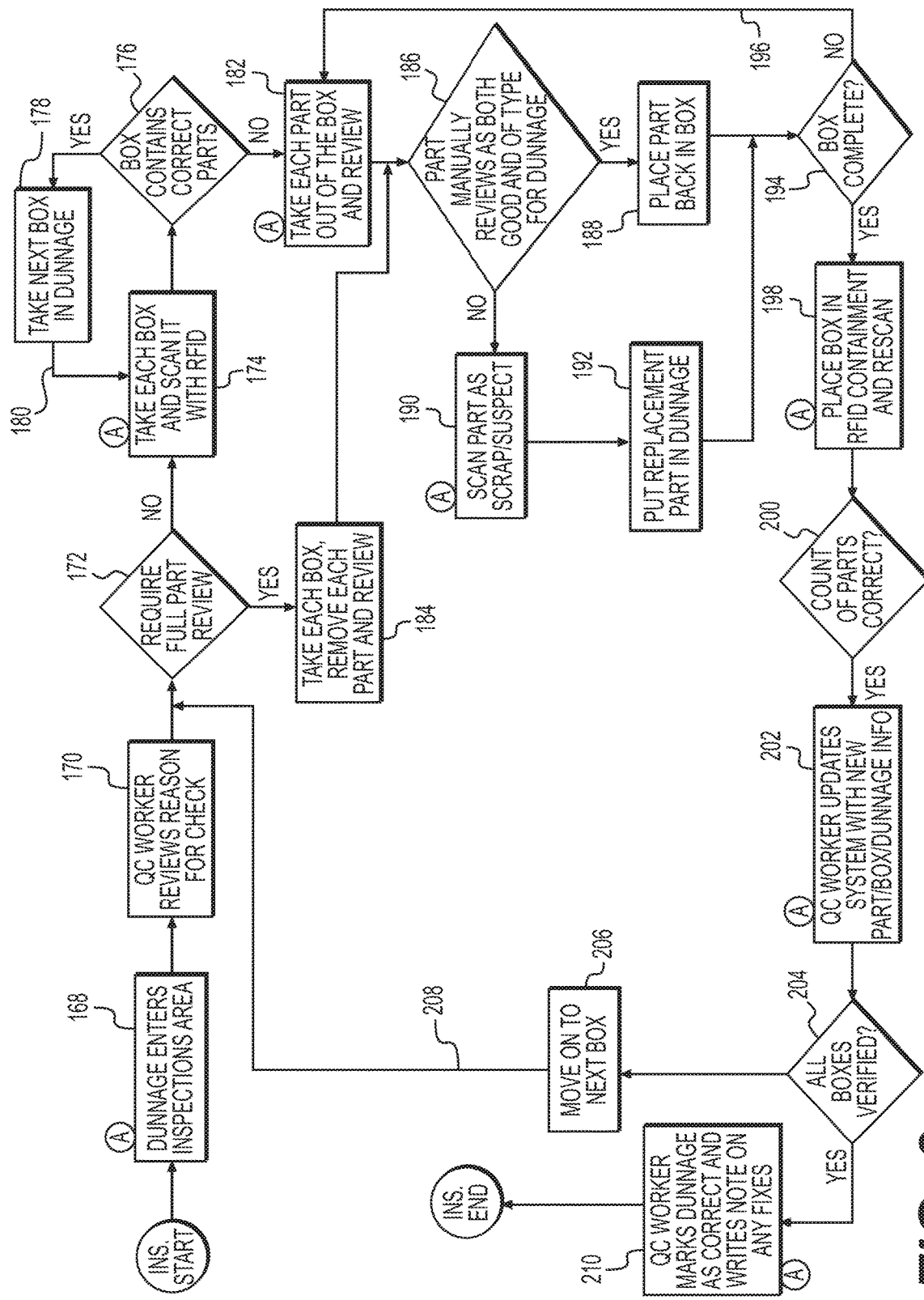

Other advantages of the present disclosure will be readily appreciated, as the same becomes better understood by reference to the following detailed description when considered in connection with the accompanying drawings wherein:

FIG. 1 is a block diagram of an example radio frequency part tracking and information storing system, according to aspects of the present disclosure; and FIGS. 2A, 2B, and 3 are flow charts illustrating steps of a method of maintaining and updating relevant part information for a plurality of parts using the cloud-based radio frequency identification system of FIG. 1, according to aspects of the present disclosure.

DETAILED DESCRIPTION

In the following description, details are set forth to provide an understanding of the present disclosure. In some instances, certain circuits, structures and techniques have not been described or shown in detail in order not to obscure the disclosure.

The description below is mostly in reference to the use of a cloud-based radio frequency identification system in conjunction with automotive parts, such as parts that are made by automotive suppliers and are installed onto vehicles by original equipment manufacturers (OEMs). This particular use of the cloud-based radio frequency identification system can be applied to almost any desirable type of part (such as air bags, manifolds, bumpers, windows, alternators, batteries, etc.) and provides an extremely wide range of advantages including, but not limited to, improved quality control, reduced shipping/logistics errors, improved warranty control, counterfeit parts protection and an improved recyclability. The use of the cloud-based radio frequency identification system to maintain part information also satisfies government regulation regarding the documentation and tracking of automotive parts. Further, the cloud-based radio frequency identification system can also be applied to parts made of a wide range of materials including plastics, metals and composites. However, it should be appreciated that the principles of the following teachings could also apply to a wide range of applications outside of the automobile industry. For example, the cloud-based radio frequency identification system could be applied to many other manufacturing industries and even to certain agricultural products.

As best shown in FIG. 1, a cloud-based radio frequency identification system 20 for maintaining and providing users with relevant part information for a plurality of parts from manufacture to disposal is provided. The system 20 includes a cloud platform server 22 including a part database 24 having the relevant part information corresponding to each of the plurality of parts. More specifically, the cloud platform server 22 includes a processor and memory which contains the part database 24 and software for uploading part information into the part database 24, associating that part information with a plurality parts and downloading that part information from the part database 24. The software allows the part database 24 to be continuously updated with part information during a life of the part. The part information in the cloud accessible database is preferably encrypted and segmented such that only certain users are privy to certain data. Thus the cloud platform server 22 may have any combination of memory storage such as random-access memory (RAM) or read-only memory (ROM), processing resources or a microcontroller or central processing unit (CPU) or hardware or software control logic to enable operation of the radio frequency identification system. Additionally, the cloud platform server 22 may include one or more wireless, wired or any combination thereof of communications ports to communicate with external resources as well as various input and output (I/O) devices, such as a keyboard, a mouse, pointers, touch controllers, and display devices. The cloud platform server 22 may also include one or more buses operable to transmit communication of management information between the various hardware components, and can communicate using wire-line communication data buses, wireless network communication, or any combination thereof.

The cloud platform server 22 with the part database 24 is preferably owned, operated and maintained by a provider which allows part and vehicle manufacturers access to the part database 24 as part of a subscription package. Thus, the part database 24 includes part information from a plurality of companies and, since the information in the part database 24 is encrypted, those companies are unable to access each others' information unless permission is granted.

The cloud platform server 22 is configured to send e-mail alerts 26 associated with the relevant part information and send text alerts 28 associated with the relevant part information. In addition, the cloud platform server is configured to communicate with at least one mobile device 30 regarding the relevant part information and provide the relevant part information through an online website 32. Therefore, the part database 24 is accessible by users in the cloud through any suitable periphery (e.g., a computer via the online website 32, the at least one mobile device 30, such as a tablet, a smart phone or a dedicated instrument). The cloud platform server 22 is further configured to communicate with at least one third party integration provider 34 and to send and receive electronic data interchange information to a plurality of customers 36.

The system 20 also includes a manufacturing network 38 disposed remotely from (e.g., disposed in a manufacturer building 40) and coupled to the cloud platform server 22. A plurality of manufacturing workstations 42 are disposed at locations at which a plurality of operation steps are carried out and communicate with the cloud platform server through the manufacturing network 38. The plurality of manufacturing workstations 42 are configured to allow for at least one of automatic entry and manual entry of the relevant part information. The system 20 also includes a supervisor dashboard 44 in communication with the cloud platform server 22 through the manufacturing network 38 and configured to provide a manufacturing supervisor with information associated with the relevant part information.

The system 20 also includes at least one radio frequency handheld scanner 46 in communication with the cloud platform server 22 through the manufacturing network 38 and configured to scan a radio frequency identification tag 48 of each of the plurality of parts and a dunnage radio frequency identification tag 50 used for dunnage. The system further includes at least one manufacturing portal 52 disposed at least one doorway of the manufacturing building and in communication with the cloud platform server 22 through the manufacturing network 38 and configured to sense (and scan) movement of the plurality of parts through the at least one doorway.

As best shown in FIGS. 2A-2B, a method of maintaining and updating relevant part information for a plurality of parts using a cloud-based radio frequency identification system 20 is also provided. The method includes the steps of 100 manufacturing one of the plurality of parts and 102 determining whether the one of the plurality of parts is good. The method proceeds by 104 marking the one of the plurality of parts as scrap in a part database 24 of a cloud platform server 22 in response to determining that the one of the plurality of parts is not good. The method then includes the step of 106 putting the one of the plurality of parts in a scrap bin in response to marking the one of the plurality of parts as scrap.

The method continues with the step of 108 applying a radio frequency identification tag 48 to the one of the plurality of parts in response to determining that the one of the plurality of parts is good. So, at the beginning of the part's life the radio frequency identification tag 48, which has a global unique identification (GUID) number, is permanently secured on the part, such as with adhesives. Radio waves can travel through many materials, and thus, the radio frequency identification tags 48 can be placed in practically any desirable location on the part. The radio frequency identification tags 48 are preferably passive tags which only activate in response to stimulation from an RFID sensor (e.g., the at least one radio frequency handheld scanner 46).

The next step of the method is 110 associating the one of the plurality of parts with the radio frequency identification tag 48 in the part database 24 of the cloud platform server 22. Thus, when the radio frequency identification tag 48 is secured to the part, a worker with the at least one radio frequency handheld scanner 46, which is connected via the manufacturing network 38 (or via the Internet) to the part database 24, uses the at least one radio frequency handheld scanner 46 to scan the radio frequency identification tag 48 that is installed on the part or that is going to be installed on the part. The worker then scans additional radio frequency identification tags 48 and/or barcodes at the work station or manually enters information into the at least one radio frequency handheld scanner 46. The additional radio frequency identification tags 48, barcodes or other information could be related to, for example, part number, revision number, manufacturer, location, build date, operator, material specification, lot number, etc. The at least one radio frequency handheld scanner 46 processes all of this information and automatically uploads it to the part database 24 along with a time stamp and associates the uploaded information with the unique GUID number of the part. This process is preferably repeated for each part being produced such that each part has its own information that is associated with its unique GUID number. If the part moves through multiple work stations during manufacture, then information may be uploaded to the part database 24 and associated with the unique GUID at each work station.

If the part being built is an assembly of a number of different and separately constructed components, then information about those separate components could also be uploaded to the part database 24 and associated with the unique GUID of the assembly. For example, if the part is a vehicle seat, then information related to the head rest, the seat back, the seat bottom and the upholstery could all be uploaded to the part database 24 and associated with the unique GUID of that particular seat. Particular synergies may be realized if the manufacturers of those separate components all used the system 20 and part information from those components is already stored in the part database 24.

Consequently, the method also includes the step of 112 determining whether the one of the plurality of parts is a work in progress. The method then includes the steps of 114 moving to a next operation step in response to determining that the one of the plurality of parts is a work in progress and 116 performing the next operation step on the one of the plurality of parts. The part database 24 can store associated work in progress steps including, but not limited to an operation type (e.g., painting, chroming, trimming, curing, etc.), operator(s) working on the operation no., supervisor(s) that setup the operation no., lot numbers of any materials added to the part during these steps, and date/time part went through the operation.

Next, 118 determining whether the one of the plurality of parts is good following the next operation step. The method continues by 120 returning to the step of 104 marking the one of the plurality of parts as scrap in response to determining that the one of the plurality of parts is not good following the next operation step. The method then includes the step of 122 scanning the one of the plurality of parts using at least one radio frequency handheld scanner 46 in communication with the cloud platform server 22 and updating the part database 24 of the cloud platform server 22 in response to determining that the one of the plurality of parts is good following the next operation step. The method additionally includes the steps of 124 returning to the step of 112 determining whether the one of the plurality of parts is a work in progress following scanning the part using the at least one radio frequency handheld scanner 46 and 126 placing the one of the plurality of parts in dunnage in response to determining that the one of the plurality of parts is not a work in progress.

Thus, the assembled parts are packaged in the dunnage, such as on a pallet or a crate and placed in inventory at the manufacturer building 40. The at least one radio frequency handheld scanner 46 can include a plurality of radio frequency handheld scanners 46 positioned throughout the manufacturer building 40 that can be used to very quickly determine precisely the entire inventory at the manufacturer building 40 by simply scanning the radio frequency identification tags 48 of the parts in inventory. This process can take less than a second and provides an exact inventory count, which breaks down the count by type of part. Thus, the system 20 provides the part manufacturer with improved inventory analysis and control as compared to other known systems which take longer to count inventory and are often not as precise as the system 20 taught herein. The assembled parts can include associated part information stored in the part database 24 including, but not limited to operators names or ID numbers working on an assembly area, any rework needed, individual parts used in assembly if fully traced, lot number if parts do not have unique IDs, training operators have taken, gage number and certification date, whether gages were checked correctly during the time period of part creation, who checked the gage and with which part, if red rabbits were checked correctly during the time period of part creation, who ran the red rabbit and which one was used, any subparts that were scrapped while assembling (e.g., may show that an issue upstream that was not caught), and supervisor name or ID number that setup the assembly area.

The method proceeds with the step of 128 associating the one of the plurality of parts with the dunnage in the part database 24 of the cloud-based platform server 22. The next step of the method is 130 applying a dunnage radio frequency identification tag 50 to the dunnage and updating the part database 24 of the cloud platform server 22 accordingly. The method also includes the step of 132 moving the dunnage to a quality control area after applying the dunnage radio frequency identification tag 50 to the dunnage. The method can also include 134 placing the dunnage in a shielded area being shielded from radio frequency signals (e.g., using a curtain that blocks or attenuates radio frequency signals). The method continues with the step of 136 scanning the dunnage and the plurality of parts using another of the at least one radio frequency handheld scanner 46 in communication with the cloud platform server 22 and updating the part database 24 of the cloud platform server 22. Next, 138 determining whether all of the plurality of parts and only the plurality of parts expected for the dunnage are found during the scan of the dunnage and the plurality of parts. The method proceeds by 140 placing the dunnage on hold in response to determining that at least one of not all of the plurality of parts and only the plurality of parts expected for the dunnage are not found during the scan of the dunnage and the plurality of parts. The method also includes the steps of 142 sending the dunnage to a quality control part review (discussed in more detail below, see FIG. 3) and 144 returning to the step of 134 placing the dunnage in a shielded area being shielded from radio frequency signals in response to completing the quality control part review.

The method continues with the step of 146 moving the dunnage to a staging area in response to determining that all of the plurality of parts and only the plurality of parts expected for the dunnage are found during the scan of the dunnage and the plurality of parts. The method proceeds by 148 passing the dunnage through a validation portal (e.g., through the at least one manufacturing portal 52) to the check the dunnage following the dunnage moving to the staging area and updating the part database 24 of the cloud platform server 22. The next steps of the method are 150 determining whether the dunnage check is successful and 152 returning to the step of 140 placing the dunnage on hold and sending the dunnage to the quality control part review (FIG. 3) in response to determining that the dunnage check is not successful. The method also includes the step of 154 moving the dunnage to a ready to ship area (e.g., in a shipping department of the manufacturer building 40) in response to determining that the dunnage check is successful.

The method proceeds with the step of 156 initiating shipment of dunnage to at least one of a plurality of customers 36 and passing the dunnage through a shipment portal to verify the plurality of parts to the dunnage and updating the part database 24 of the cloud platform server 22 (following the dunnage moving to the ready to ship area). Next, 158 determining whether the plurality of parts are verified to the dunnage and 160 moving the dunnage to the quality control area in response to determining that the plurality of parts are not verified to the dunnage. The method continues with the step of 162 sending the dunnage to the quality control part review (FIG. 3). The method also includes the step of 164 returning to the step of 154 moving the dunnage to a ready to ship area (e.g., in the shipping department). The method can also include the step of 166 setting the dunnage as sent to customer review in the part database 24 of the cloud platform server 22 in response to determining that the plurality of parts are verified to the dunnage.

So, in the shipping department, without opening the packaging, the parts can be once again scanned with the at least one radio frequency handheld scanner 46, and information associated with the GUID numbers of the radio frequency identification tags 48 that are scanned can be compared to the information of a customer order to ensure that the correct number and types of parts are in the package. This entire process can be implemented very quickly with the at least one radio frequency handheld scanner 46. Thus, the system 20 taught herein provides the part manufacturer with improved, more efficient shipping logistics and may substantially reduce the number of incorrect deliveries (such as parts going to the wrong customer, the wrong types of parts going to the right customer, the wrong number of parts being in the package, etc.).

As best shown in FIG. 3, the step of sending the dunnage to a quality control part review of the method includes the step of 168 moving the dunnage to an inspection area and updating the part database 24 of the cloud platform server 22. The method then includes the step of 170 reviewing a quality control reason for check by a quality control operator. Such quality control issues or reasons can include, but are not limited to customer calls with potential issue affecting parts, an issue found with an input into the part (resin, sub assembly parts, tooling, etc.), improper packaging, mixed parts in the packaging or dunnage, too few parts found in packaging, too many parts found in packaging, scrapped or defective parts found in packaging, new part line (e.g., when a new part line has been started, the initial 30-90 days of parts may all go through extra inspections to verify that everything is working correctly and meet customer specifications), and customer returned due to shipping issue or out of order labeling. Such quality control issues can be associated with the GUID in the part database 24.

The quality control part review can continue with the steps of 172 determining whether a full part review is required and 174 scanning one of a plurality of boxes in the dunnage using another of the at least one radio frequency handheld scanner 46 in communication with the cloud platform server 22 and updating the part database 24 of the cloud platform server 22 in response to determining a full part review is not required. The method can proceed by 176 determining whether the one of the plurality of boxes contains the correct parts based on the scan of the one of the plurality of boxes. The method also includes the step of 178 checking another one of the plurality of boxes in the dunnage in response to determining that the one of the plurality of boxes contains the correct parts.

The quality control part review then includes the step of 180 returning to the step of scanning one of the plurality of boxes in the dunnage using another of the at least one radio frequency handheld scanner 46 in communication with the cloud platform server 22. The method continues by 182 reviewing each of the plurality of parts in the one of the plurality of boxes and updating the part database of the cloud platform server accordingly in response to determining that the one of the plurality of boxes does not contain the correct parts. The method also includes the steps of 184 reviewing each of the plurality of parts in the one of the plurality of boxes in response in response to determining a full part review is required and 186 determining whether one of the plurality of parts in the one of the plurality of boxes reviews as both good and of a type for the dunnage following the review of each of the plurality of parts in the one of the plurality of boxes. The method can continue by 188 placing the one of the plurality of parts back in the one of the plurality of boxes in response to determining that the one of the plurality of parts in the one of the plurality of boxes reviews as good and of a type for the dunnage.

The quality control part review then includes the step of 190 scanning the one of the plurality of parts as scrap using another of the at least one radio frequency handheld scanner 46 in communication with the cloud platform server 22 and updating the part database 24 of the cloud platform server 22 in response to determining that the one of the plurality of parts in the one of the plurality of boxes reviews as at least one of not good and not of a type for the dunnage. The quality control issues that may cause parts to scrapped (and which can be associated with the GUID in the part database 24) can include, but are not limited to start-up scrap (e.g., scrap produced during a warm up cycle of an injection molding tool), warp (e.g., part has bend that is outside of the limits defined), flash (e.g., excessive flash has been found on the part), closed hole (e.g., any assembly required hole is partially or fully filled making it unusable in further assembly), flashed over hole (e.g., the opening to a hole is covered over with excessive flash), crack (e.g., a crack has been found that is either in a visible location and not allowed or that is large enough to make the part unstable), short shot (e.g., flash did not completely fill the mold and the part was not fully created), streaks (e.g., the resin colorant did not mix completely, or due to heating the part has visible streaks or burn marks in it), gouge (e.g., while being removed from the mold, the part ended up getting a gouge in it).

The quality control part review can additionally include the steps of 192 replacing the one of the plurality of parts with a replacement part in the one of the plurality of boxes in dunnage and 194 determining whether the one of the plurality of boxes is complete (following one of replacing the one of the plurality of parts with a replacement part and placing the one of the plurality of parts back in the one of the plurality of boxes). The method can also include 196 returning to the step of reviewing each of the plurality of parts in the one of the plurality of boxes in response to determining that the one of the plurality of boxes is not complete and 198 moving the one of the plurality of boxes to a radio frequency identification containment area to rescan (e.g., using the at least one radio frequency handheld scanner 46) and updating the part database 24 of the cloud platform server 22 in response to determining that the one of the plurality of boxes is complete.

The quality control part review then includes the step of 200 confirming that a count of the plurality of parts is correct. Next, 202 updating the part database 24 of the cloud platform server 22 with related new part information and box information and dunnage information for the one of the plurality of boxes by the quality control operator. The method continues by 204 determining whether all of the plurality of boxes of the dunnage have been verified. The method also includes 206 moving to the next of the plurality of boxes of the dunnage and 208 returning to the step of 172 determining whether a full part review is required in response to determining that all of the plurality of boxes of the dunnage have not been verified. The quality control part review can conclude by 210 marking the dunnage as correct in the part database 24 of the cloud platform server 22 by the quality control operator in response to determining that all of the plurality of boxes of the dunnage have been verified.

During the operating life of the part, certain other advantages may be realized through the use of the cloud-based radio frequency identification system 20. In an automotive application, when a customer brings his or her vehicle with many parts that have radio frequency identification tags 48 on them into any service center, a worker may use a wand-like RFID scanner (e.g., similar to the at least one radio frequency handheld scanner 46) to scan the various radio frequency identification tags 48 in the vehicle. The scanner can communicate with a computer which very quickly downloads the information associated with the GUIDs of those radio frequency identification tags 48 from the part database 24. The cloud platform server 22 may then recommend maintenance that needs to be done for certain parts. For example, some vehicle parts are known to have expiration dates, and these expiration dates can be stored on the cloud accessible database at the time the parts are manufactured. During routine maintenance, the cloud platform server 22 can determine if any parts in the vehicle have expired and, if so, recommend replacement. The scanning, downloading and recommendation operations can all occur extremely quickly as part of routine vehicle maintenance using the system 20 without taking anything apart or entering a vehicle identification number (VIN) into a computer (e.g., through the online website 32).

The part database 24 may also include information (such as instructions, figures and/or videos) which teaches the service provider how to perform maintenance on the vehicle may also be stored on the database. For example, if the computer has recommended replacement of an air bag, the service provider can quickly download from the cloud accessible database instructions related to the replacement process. This may save the service provider time and effort by removing the need to research those instructions, thus allowing the service provider to replace the part more quickly.

The system 20 also provides advantages by exposing counterfeit parts to vehicle service providers and parts retailers. In addition to costing genuine automotive parts manufacturers billions of dollars annually, counterfeit parts, while they may look nearly identical to the genuine parts, are often of inferior quality and present safety concerns to unsuspecting vehicle owners. Currently, many part manufacturers use barcodes and/or laser etching to identify parts, but the counterfeit part makers can easily duplicate these efforts. Therefore, a vehicle service provider or a retail parts provider, such as the service department at a dealership, may attempt to only use genuine parts but may itself be fooled into thinking that counterfeit parts are genuine, and a customer has no knowledge that this has occurred.

The radio frequency identification tags 48 can, for example, contain 32 hexidecimal digits, which offers over thirty million different possible combinations, thus making these radio frequency identification tags 48 practically impossible to duplicate. Therefore, before a vehicle service provider installs a part on a vehicle or before a retail parts provider sells a part to a customer, the part can be scanned with an RFID scanner (such as the at least one radio frequency handheld scanner 46), and the part database 24 can be searched for information associated with that part based on the GUID of the part's radio frequency identification tag 48. If no radio frequency identification tag 48 is found, if the GUID is not found in the part database 24 or if the information associated with that GUID appears to be incorrect, then the service provider knows that the part is not genuine and should not be installed on the vehicle.

The system 20 also provides advantages by making part recycling substantially easier for vehicle service providers and recyclers, thereby reducing waste. Currently, many parts are identifiable via either laser etching or barcodes. Neither of these options provides much, if any, information about the material that the part is made of. Further, when a vehicle service provider removes a used part from a vehicle, even though that part may have some value to recycling and dismantling companies, it is very difficult to sell that part and any expected revenue that selling the used part could generate is often not worth the effort. Therefore, many used automotive parts end up being thrown away.

As discussed above, the part database 24 includes information related to the quality of any materials that the parts are made of. This information can also include information related to the exact manufacturers and chemical compositions of any materials that the part is made of. When a service center takes an old part off of a vehicle, the dealership, using a RFID scanner (such as the at least one radio frequency handheld scanner 46), can very quickly post the part to an online marketplace that is accessible to recycling and dismantling companies, and the material quality information stored on the cloud accessible database is automatically attached to the part on the online marketplace. The recycler or dismantler, therefore, has all of the relevant information to make an educated buying decision and can very quickly purchase the part from the vehicle service provider. To the vehicle service provider, this entire process requires very little effort but increases profitability by adding an additional source of revenue. To the recycler or dismantler, this process provides a new source of parts with a guarantee on what materials those parts are made of and the quality of those materials. More specifically, for injection molded parts, the part information in the part database 24 can include, but is not limited to machine parameters (e.g., tool identification number), mold temperature, mold pressure, hold or pack times, date time part was stamped, passed inspection first time through, required rework, required review of part marked as suspect, resins used, quantity used, lot numbers of resins, operator(s) working on press line, history of trainings for the operator(s) working on the line, supervisor(s) that setup the run, if gages were checked correctly during the time period of part creation, who checked the gage and with which part, if red rabbits (known defective part) were checked correctly during the time period of part creation, who ran the red rabbit and which one was used, and were there any active quality alerts for that part type.

The system 20 also provides certain benefits to both original equipment manufacturers (OEMs) and suppliers with regards to warranty tracking. During assembly of the vehicle, the GUIDs of the radio frequency identification tags 48 are all associated with the VIN of the vehicle. Then, when a customer brings his or her vehicle into a service center for a warranty repair, the defective part can be quickly analyzed to determine if there may have been a manufacturing problem which led to the defection, with the use of the cloud-accessible database, the OEM can determine which other vehicles have parts with similar information (e.g., same molding equipment, same material used, same assembler, etc.). That is, the information contained in the part database 24 and data associated with warranty repairs can be analyzed to establish patterns to determine the root cause of the part failures (e.g., faulty material, faulty equipment, etc.). The OEM, if it determines that one is necessary, can then do a targeted recall to replace parts only for specific vehicles that are at risk for part failure. This is substantially less costly and more effective than the current recall process, which typically involves recalling an extremely large number of vehicles, many of which do not have defective parts.

The part information stored in the part database 24 may also be segmented such that parties can share all or less than all of the information related to their parts with other parties. For example, in the automobile manufacturing industry, OEMs may be able to access some information (such as, for example, manufacturing date and material batch used) associated by a part manufactured by a tier one supplier but not other information (such as molding information or the name of the person who operated the mold to make the part). Similarly, recycling and dismantling companies may only be allowed access to the information pertaining to the materials and material quality of the parts. This allows the users of the system 20 to have certain control over their information that is stored in the part database 24.

Clearly, changes may be made to what is described and illustrated herein without departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example radio frequency identification system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device or system may be otherwise oriented (rotated degrees or at other orientations) and the spatially relative descriptions used herein interpreted accordingly.

What is claimed is:

1. A method of maintaining and updating relevant part information for a plurality of parts using a cloud-based radio frequency identification system, comprising the steps of:
   manufacturing one of the plurality of parts;
   determining whether the one of the plurality of parts is good;
   applying a radio frequency identification tag to the one of the plurality of parts in response to determining that the one of the plurality of parts is good;
   associating the one of the plurality of parts with a radio frequency identification tag in a part database of a cloud platform server;
   associating the one of the plurality of parts with dunnage in the part database of the cloud platform server;
   applying a dunnage radio frequency identification tag to the dunnage and updating the part database of the cloud platform server accordingly;
   scanning the dunnage and the plurality of parts using another of the at least one radio frequency handheld scanner in communication with the cloud platform server and updating the part database of the cloud platform server;
   determining whether all of the plurality of parts and only the plurality of parts expected for the dunnage are found during the scan of the dunnage and the plurality of parts;
   placing the dunnage on hold in response to determining that not all of the plurality of parts and only the plurality of parts expected for the dunnage are found during the scan of the dunnage and the plurality of parts;
   sending the dunnage to a quality control part review;
   initiating shipment of dunnage to at least one of a plurality of customers and passing the dunnage through a shipment portal to verify the plurality of parts to the dunnage and updating the part database of the cloud platform server;
   determining whether the plurality of parts are verified to the dunnage; and
   setting the dunnage as sent to customer review in the part database of the cloud platform server in response to determining that the plurality of parts are verified to the dunnage;
   wherein the step of sending the dunnage to a quality control part review includes the steps of:
   determining whether a full part review is required;
   scanning one of the dunnage using another of the at least one radio frequency handheld scanner in communication with the cloud platform server and updating the part database of the cloud platform server in response to determining a full part review is not required;
   determining whether the one of the dunnage contains the correct parts based on the scan of the one of the dunnage;
   checking another one of the dunnage and returning to the step of scanning one of the dunnage using another of the at least one radio frequency handheld scanner in communication with the cloud platform server in response to determining that the one of dunnage contains the correct parts;
   reviewing each of the plurality of parts in the one of the dunnage in response to determining a full part review is required;
   determining whether one of the plurality of parts in the one of dunnage reviews as both good and of a type for the dunnage following the review of each of the plurality of parts in the one of the dunnage;
   determining whether the one of the dunnage is complete;
   returning to the step of reviewing each of the plurality of parts in the one of the dunnage in response to determining that the one of the dunnage is not complete;
   moving the one of the dunnage to a radio frequency identification containment area to rescan and updating the part database of the cloud platform server in response to determining that the one of the dunnage is complete;
   confirming that a count of the plurality of parts is correct;
   updating the part database of the cloud platform server with related new part information and box information and dunnage information for the one of the dunnage by the quality control operator;
   determining whether all of the dunnage of the dunnage have been verified;
   moving to the next of the of the dunnage and returning to the step of determining whether a full part review is required in response to determining that all of the dunnage have not been verified;
   marking the dunnage as correct in the part database of the cloud platform server by the quality control operator in response to determining that all of the dunnage have been verified;
   encrypting and segmenting the part information in the part database of the cloud platform server for a first group of users and a second group of users; and
   allowing the first group of users to access the part information segmented for the first group of users while preventing access by the second group of users to the part information segmented for the first group of users;
   scanning at least one of the plurality of parts at a service center at which maintenance of the at least one of the plurality of parts is performed.

2. The method as set forth in claim 1, further including the steps of:
   marking the one of the plurality of parts as scrap in the part database of the cloud platform server in response to determining that the one of the plurality of parts is not good; and
   putting the one of the plurality of parts in a scrap bin in response to marking the one of the plurality of parts as scrap.

3. The method as set forth in claim 2, further including the steps of:
   determining whether the one of the plurality of parts is a work in progress; and placing the one of the plurality of parts in dunnage in response to determining that the one of the plurality of parts is not a work in progress.

4. The method as set forth in claim 3, further including the steps of:
moving to a next operation step in response to determining that the one of the plurality of parts is a work in progress;
determining whether the one of the plurality of parts is good following the next operation step;
returning to the step of marking the one of the plurality of parts as scrap in response to determining that the one of the plurality of parts is not good following the next operation step;
scanning the one of the plurality of parts using at least one radio frequency handheld scanner in communication with the cloud platform server and updating the part database of the cloud platform server in response to determining that the one of the plurality of parts is good following the next operation step; and
returning to the step of determining whether the one of the plurality of parts is a work in progress following scanning the part using the at least one radio frequency handheld scanner.

5. The method as set forth in claim 1, further including the step of moving the dunnage to a quality control area in which a quality control part review is completed after applying the dunnage radio frequency identification tag to the dunnage.

6. The method as set forth in claim 1, further including the steps of:
placing the dunnage in a shielded area being shielded from radio frequency signals using a curtain that blocks or attenuates radio frequency signals; and
returning to the step of placing the dunnage in a shielded area being shielded from radio frequency signals in response to completing the quality control part review.

7. The method as set forth in claim 1, further including the steps of moving the dunnage to a staging area in response to determining that all of the plurality of parts and only the plurality of parts expected for the dunnage are found during the scan of the dunnage and the plurality of parts.

8. The method as set forth in claim 1, further including the step of passing the dunnage through a validation portal being a manufacturing portal disposed at a doorway of a manufacturing building and configured to scan movement of the plurality of parts through the doorway to the check the dunnage following the dunnage moving to the staging area and updating the part database of the cloud platform server.

9. The method as set forth in claim 1, further including the steps of:
determining whether the dunnage check is successful;
returning to the step of placing the dunnage on hold and sending the dunnage to a quality control part review in response to determining that the dunnage check is not successful; and
moving the dunnage to a ready to ship area in response to determining that the dunnage check is successful.

10. The method as set forth in claim 1, further including the steps of:
moving the dunnage to the quality control area in response to determining that the plurality of parts are not verified to the dunnage; and
sending the dunnage to the quality control part review.

11. The method as set forth in claim 1, further including the steps of:
moving the dunnage to an inspection area and updating the part database of the cloud platform server; and
reviewing a quality control reason for check by a quality control operator.

12. The method as set forth in claim 1, further including the step of reviewing each of the plurality of parts in the one of the dunnage and updating the part database of the cloud platform server accordingly in response to determining that the one of the dunnage does not contain the correct parts.

13. The method as set forth in claim 1, further including the step of placing the one of the plurality of parts back in the one of the dunnage in response to determining that the one of the plurality of parts in the one of the dunnage reviews as good and of a type for the dunnage.

14. The method as set forth in claim 1, further including the steps of:
scanning the one of the plurality of parts as scrap using another of the at least one radio frequency handheld scanner in communication with the cloud platform server and updating the part database of the cloud platform server in response to determining that the one of the plurality of parts in the one of the dunnage reviews as at least one of not good and not of a type for the dunnage; and
replacing the one of the plurality of parts with a replacement part in the one of the dunnage.

15. The method as set forth in claim 1, further including the step of recommending necessary maintenance of the at least one of the plurality of parts in response to scanning the at least one of the plurality of parts at the service center.

16. The method as set forth in claim 1, further including the steps of:
providing teaching materials to a service provider chosen from the group consisting of instructions, figures, and videos in response to scanning the at least one of the plurality of parts at the service center; and
teaching the service provider how to perform maintenance of the at least one of the plurality of parts.

17. The method as set forth in claim 1, wherein the step of scanning the at least one of the plurality of parts at the service center at which maintenance of the at least one of the plurality of parts is performed includes scanning the at least one of the plurality of parts without removing the at least one of the plurality of parts from an assembly to which the at least one of the plurality of parts is attached.

18. The method as set forth in claim 1, further including the steps of:
scanning the at least one of the plurality of parts at a recycler at which recycling of the at least one of the plurality of parts is performed; and
identifying a material that the at least one of the plurality of parts is made of in response to scanning the at least one of the plurality of parts at the recycler to facilitate recycling.

* * * * *